United States Patent [19]
Ellison

[11] Patent Number: 6,073,237
[45] Date of Patent: Jun. 6, 2000

[54] TAMPER RESISTANT METHOD AND APPARATUS

[75] Inventor: Carl Ellison, Baltimore, Md.

[73] Assignee: CyberCash, Inc., Reston, Va.

[21] Appl. No.: 08/965,595

[22] Filed: Nov. 6, 1997

[51] Int. Cl.$^7$ .................... H04L 9/12; H04L 9/32
[52] U.S. Cl. ............... 713/171; 713/172; 713/183; 713/185; 705/67; 705/71; 705/77; 380/281
[58] Field of Search .................. 380/21, 24, 25, 380/279, 281, 283, 284; 705/66, 70, 64, 71, 67, 77; 713/171, 172, 183, 185

[56] References Cited

U.S. PATENT DOCUMENTS

| | | | |
|---|---|---|---|
| 4,288,659 | 9/1981 | Atalla | 380/23 |
| 4,423,287 | 12/1983 | Zeidler | 380/24 |
| 4,965,568 | 10/1990 | Atalla et al. | 340/825.34 |
| 5,196,840 | 3/1993 | Leith et al. | 340/825.3 |
| 5,371,794 | 12/1994 | Diffie et al. | 380/21 |
| 5,406,628 | 4/1995 | Beller et al. | 380/30 |
| 5,434,918 | 7/1995 | Kung et al. | 380/25 |
| 5,442,342 | 8/1995 | Kung | 340/825.34 |
| 5,469,507 | 11/1995 | Canetti et al. | 380/30 |
| 5,475,756 | 12/1995 | Merritt | 380/24 |
| 5,483,596 | 1/1996 | Rosenow et al. | 380/25 |
| 5,557,678 | 9/1996 | Ganesan | 380/21 |
| 5,568,552 | 10/1996 | Davis | 380/4 |
| 5,596,642 | 1/1997 | Davis et al. | 380/24 |
| 5,684,951 | 11/1997 | Goldman et al. | 713/202 |

FOREIGN PATENT DOCUMENTS 752 636 A2  1/1997  European Pat. Off. .

Primary Examiner—Gilberto Barrón, Jr.
Attorney, Agent, or Firm—Roberts Abokhair & Mardula, LLC

[57] ABSTRACT

A method for securing data in a tamper resistant fashion on a computer connected to a network. The presence of a user on a network is established using one protocol with routine operations conducted by the user on the network using a second protocol. Public and private key encryption is used to establish the validity of both the user and the server on the network user on the network. Keys are passed only after verification of the authenticity of the user on the network.

18 Claims, 3 Drawing Sheets

TAMPER RESISTANT METHOD AND APPARATUS

BACKGROUND OF THE INVENTION

This invention relates generally to methods of secure electronic commerce over a network. More specifically the invention relates to a method and apparatus for achieving tamper resistant status for commercial transactions over a network.

BACKGROUND

Commerce has become increasingly electronic in nature with wire transfer of funds a common occurrence. Further the use of open networks, such as the Internet, has become a primary vehicle by which electronic commerce takes place. With the increase in electronic commerce, a danger builds that such electronic commerce can be tampered with, falsified and fraudulently conducted.

In response to the potential for fraud on the Internet various inventions have been generated to secure the transactions of users. For example, the concept of a "wallet" which is an electronic version of money held by a user is protected in part by a private key known only to the user. The private key is kept secret since the key is part of wallet data which is encrypted and stored in a computer. In normal implementations, the encryption key that protects the wallet data is generated by a cryptographic hash of a user's passphrase/pass phrase. The difficulty with this approach to security is that typical users will choose a passphrase which is easy to remember and quick to type. Unfortunately, such characteristics also make the passphrase easy to guess. Worse still are the users who write their pass phrases down and keep them in close proximity to their computers. This is a recipe for disaster, in the event that the passphrase is discovered.

Security can be improved by storing the especially private data (such as private encryption keys) in a hardware token. Such hardware tokens as smartcards, or PCMCIA cards are readily available on the market today and comprise memory, microprocessors, and computational abilities. When an essential secret is stored in such hardware token, access to the token is permitted by provision of a small passphrase or PIN (Personal Identification Number). The token can and usually does keep track of the number of consecutive false guesses of a passphrase or PIN made by a user. When the count of incorrect guesses exceeds a certain threshold, the token can delete the secret it is holding or refuse further attempts for a period of time, potentially years, such that an uninvited user will not be able to access an individual's secret. This computational capability cannot be duplicated on a PC, via normal software. Any counter of false attempts can be reset by the attacker and becomes ineffective, in this case. The subject of tamper resistant storage has been the basis on which several patents have been granted.

U.S. Pat. No. 5,596,642, issued to Davis et al., discloses a system to digitally authenticate and exchange information between a removable stored value card terminal. The '642 invention discloses use of passphrases, random keys, and on to achieve the desired authentication and exchange of information. In particular, the '642 invention discloses a process for establishing a secure session after an automatic dual challenge procedure between the stored value card and the terminal, where each is validated to perform the desired interaction. This validation includes establishing a one time session key used to encrypt certain information passed between the stored value card and the terminal. In addition a range of encryption techniques using data encryption standard keys are incorporated. Though the dual challenge procedure of '642 is somewhat similar to the challenge process of the present invention, the integration of the challenge process and signature keys with symmetric key encryption of the present invention is not disclosed.

U.S. Pat. No. 5,568,552, issued to Davis, discloses a method for electrical transfer of a software license between multiple hardware locations, thereby preserving the software license characteristics, while eliminating the need for removable external or auxiliary hardware authentication devices. The '552 invention uses a combination of symmetric and asymmetric keys in combination with bus hardware devices to accomplish the objectives. The '552 invention distributes the key material through-out the network and does not disclose a method whereby the key information is held in a more secure in at a single location.

U.S. Pat. No. 5,557,678 issued to Ganesan, discloses a method for use of split private keys in a public key cryptographic system. The method involves use of a central authority which retains the public keys and a portion of the private key of each user. In this manner, authorized individuals (FBI & Justice) can intercept the suspect communications without compromise of other user communications. Though the '678 invention retains some of the key material at the central authority and is therefore less subject to compromise, integration of the challenge process and signature keys with symmetric key encryption of the present Invention is not disclosed.

U.S. Pat. No. 5,483,596 issued to Rosenow, et al. discloses an apparatus and method for maintaining access control between system resources or users. The '596 invention relies on a physical device that is interposed between the users and which includes encryption material that is embedded or stored within the device. The '596 invention does disclose a form of challenge process between the devices prior to establishing the interconnection. To reduce the need for each device to store comprehensive authorized resource tables, the '596 invention relies on a separate data path between a central access control system and the individual devices. This path is in addition to the path used by the devices to establish a communications link. Integration of the challenge process and signature keys with symmetric key encryption of the present invention is not disclosed.

U.S. Pat. No. 5,469,507 issued to Cainito, et al. discloses a method to provide secure communication and computation in a system that may be subject to different types of intruders or "viruses." The method of '507 relies to some extent on the presence of multiple processors in a network system, with a form of voting or corroboration from and between each of the processors. Additionally, a form of challenge and response is disclosed. However, the '507 invention discloses neither use of symmetric keys in conjunction with public/private keys nor use of an exponentially increasing timeout process.

U.S. Pat. No. 5,406,628 issued to Belle, et al. discloses a method to achieve mutual authentication and session key agreement between a pair of users using public key cryptography. An objective of the '628 invention is reduced computational complexity for a disadvantaged user (like a wireless terminal), with associated increase in computational complexity at the other user (like a large server in a wireless personal communication system). The '628 invention discloses a challenge and response technique for authentication, in conjunction with public/private keys. However, there is no apparent disclosure of those steps with a symmetric key, and exponentially increasing time-out process.

U.S. Pat. No. 5,371,794 issued to Diffie, et al. discloses a method for authentication between two users on a wireless network. The '794 invention discloses a series of authentication steps coupled with random numbers and public/private keys that is somewhat similar to the present invention. However, the order of the steps is different, not all steps appear in the '794 invention, and it is unclear whether the final session key in the '794 invention is of the same form as the session key of the present invention. The '794 session key appears to be a combination of the two random numbers used in the authentication, while the present invention appears to use a unique session key unrelated to the random numbers used in the authentication.

U.S. Pat. No. 5,196,840 issued to Leith, et al. discloses a system to provide authentication and security between two users. The '840 invention does not require storage of a cypher key at the remote computer and the remote user code or PIN is not transferred between the two users. The '840 invention also uses one of the random numbers that established the authentication as the session key. Integration of the challenge Process and signature keys with symmetric key encryption of the present invention is not disclosed.

It is therefore an object of the present invention to provide tamper resistance for storage of secrets, typically on a Personal Computer, provided only that it is connected to a network.

It is a further object of the present invention to provide enhanced security and tamper resistance to networks using public and private key encryption of transactions.

It is a further object of the present invention to limit the ability of an active eavesdropper to access information from the server on the tamper resistant network of the present invention.

It is a further object of the present invention to enhance the security associated with the use of public and private key encryption of transactions.

It is a further object of the present invention to employ the networked tamper resistance server in a challenge response mode thereby authenticating the validity of users on the network.

It is a further object of the present invention to pass symmetric keys in encrypted form to users only after verification of the authenticity of the user on a network.

It is a further object of the present invention to increase exponentially the time between unsuccessful attempts by a party to access the network.

It is a further object of the present invention to contact user's whose secrets have been the subject of attempted unsuccessful attempts.

These and other objectors of the present invention will become apparent after a view of the general and detailed description that follows. The present invention involves the use of public and private key, and encrypted session keys to establish the identity and validity of both the user and the server on the tamper resistant network. To more fully understand the detailed description that follows the following provides certain definitions of terms used.

K1s—a private signature key, used in Public Key cryptography.

P1s—a public key associated with private key K1 in Public key cryptography.

K1e—a private enciphering key, used in Public Key cryptography.

P1e—a public enciphering key associated with private key K1 in Public Key cryptography.

K2—a private key.

P2—a public key corresponding to the private key K2.

$K_s$—a symmetric key.

$K_n$—the private key of the server itself.

$P_n$—the public key of the server itself.

In the present invention certain data is kept by the user and other data is kept by tamper-resistant hardware that is available to the user over a network and not necessarily owned by the user. The private keys K1 and K1e and their corresponding public keys P1s and P1e, K2 a private key encrypted by a symmetric key $K_s$, P2 the public key corresponding to K2, certificates giving authority to P2 (and therefore to K2), and a public key $P_n$ for the networked tamper resistant server are kept by the user.

For each user the tamper resistant server stores the following information:

P1s (the public signature key of the user which is also used as an index associated with user data), $K_s$ a symmetric session key, the user passphrase which is used for authentication, an integer count (referred to as the letter C), and internal time T which is used by the server to refuse service to a user in the event of attempted unauthorized access, an access count, set by a user, after which a user will be notified when unauthorized attempted accesses exceed the count number, notification addresses for all users to be used when unauthorized attempted accesses occur, and the private key $K_n$ of the server itself. This above information is used in the initial contact between the computer in need of tamper resistant storage and the networked tamper resistant server. Once valid authenticated communication is established using public/private key, a symmetric key is exchanged with the user and subsequently used by the user to encipher and implicitly authenticate all subsequent transactions over the network.

Use of the tamper resistant procedures are more fully described in the detailed description that follows. These procedures give rise to a storage facility capable of greatly diminishing authorized access attempts.

DETAILED DESCRIPTION OF THE PREFERRED EMBODIMENT

Figure 1:
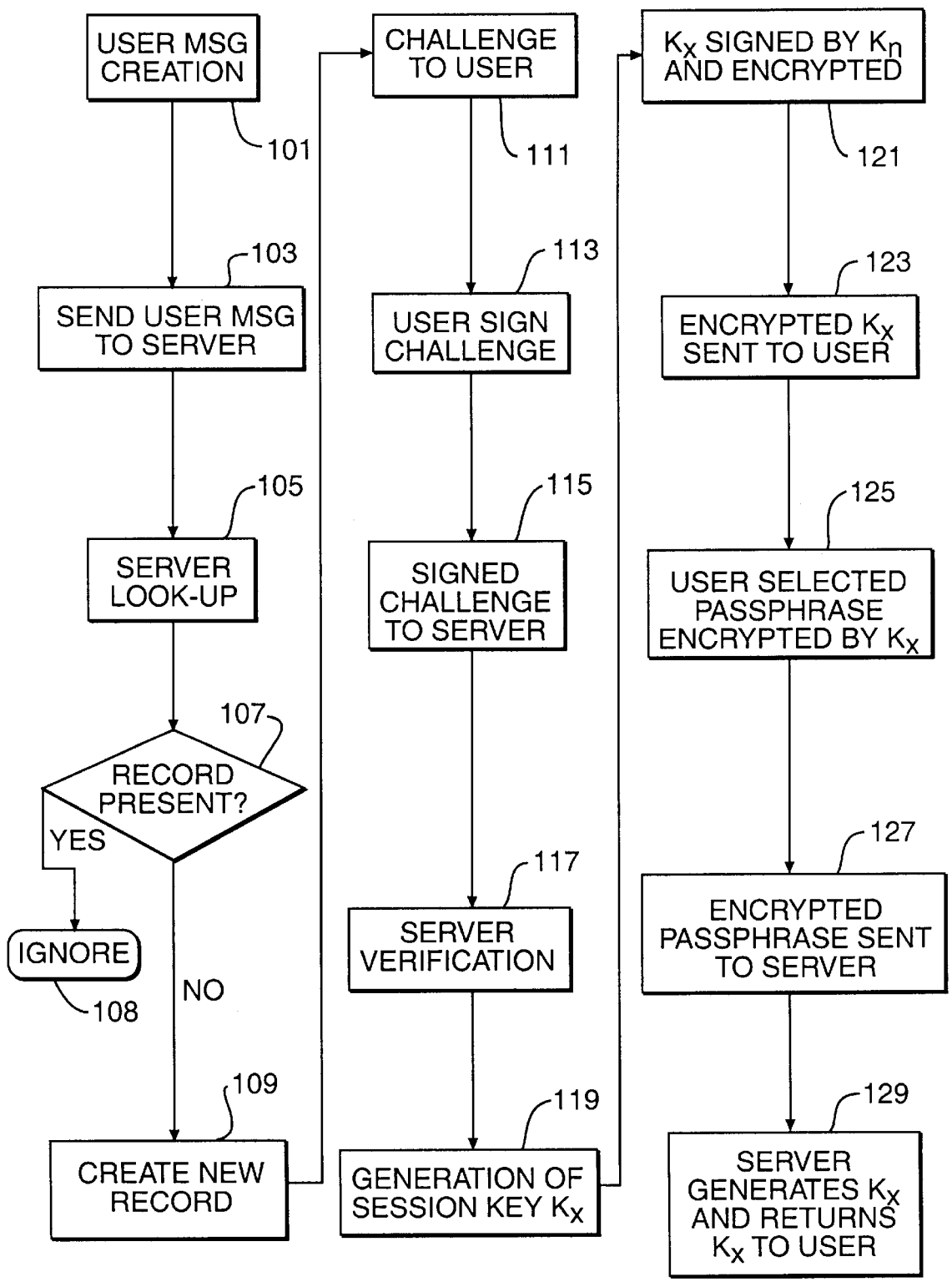
FIG. 1. The initialization protocol

Referring to FIG. 1 the initialization protocol is described whereby a new user establishes a new use or "account" at the networked tamper resistant server. To begin the process, the user 101 sends a message to the server consisting of the user's public key (P1s) and a transaction I.D. (Z) together with a request for a new record. This message is sent to the server 103. The server looks up the user's public key (P1s) to verify there is no such record 105. If there is such a record 107 the server ignores the message 108. If however there is no such record, 107, the server creates a new record 109 and sends a random challenge Y 111 to the user. The user receives the random challenge and signs the challenge 113 with K1s and sends that random challenge to the server 115.

The server verifies the signature 117 on Y using P1s, and, if the signature is verified, generates a session key for the initialization protocol $K_x$ 119. The session key $K_x$ is signed by private key of the server itself $K_n$ 121 and encrypted by the public key of the user P1e. The encrypted and signed session key $K_x$ is then sent back to the user 123.

The user decrypts the message from the server containing the session key $K_x$. The user next chooses a passphrase and encrypts the passphrase using $K_x$ 125 and sends the encrypted passphrase to the server 127. The server generates a symmetric key $K_s$ and returns it to the user after encrypting the symmetric key using $K_x$ 129.

After this initialization protocol the user has generated a private key, K2 and a public key P2 and uses the symmetric key $K_s$ to encrypt the private key K2 and possibly other essential secrets. The encrypted secret material is written to the user's disk for later use during normal operations. This encrypted secret material is assumed to be a part of a larger file and that larger file is assumed to be enciphered before writing on the user's disk, that encipherment using a lower-entropy symmetric key, computed directly from a user's pass phrase. That larger file includes the other keys which the user stores for use in this invention.

Figure 2:
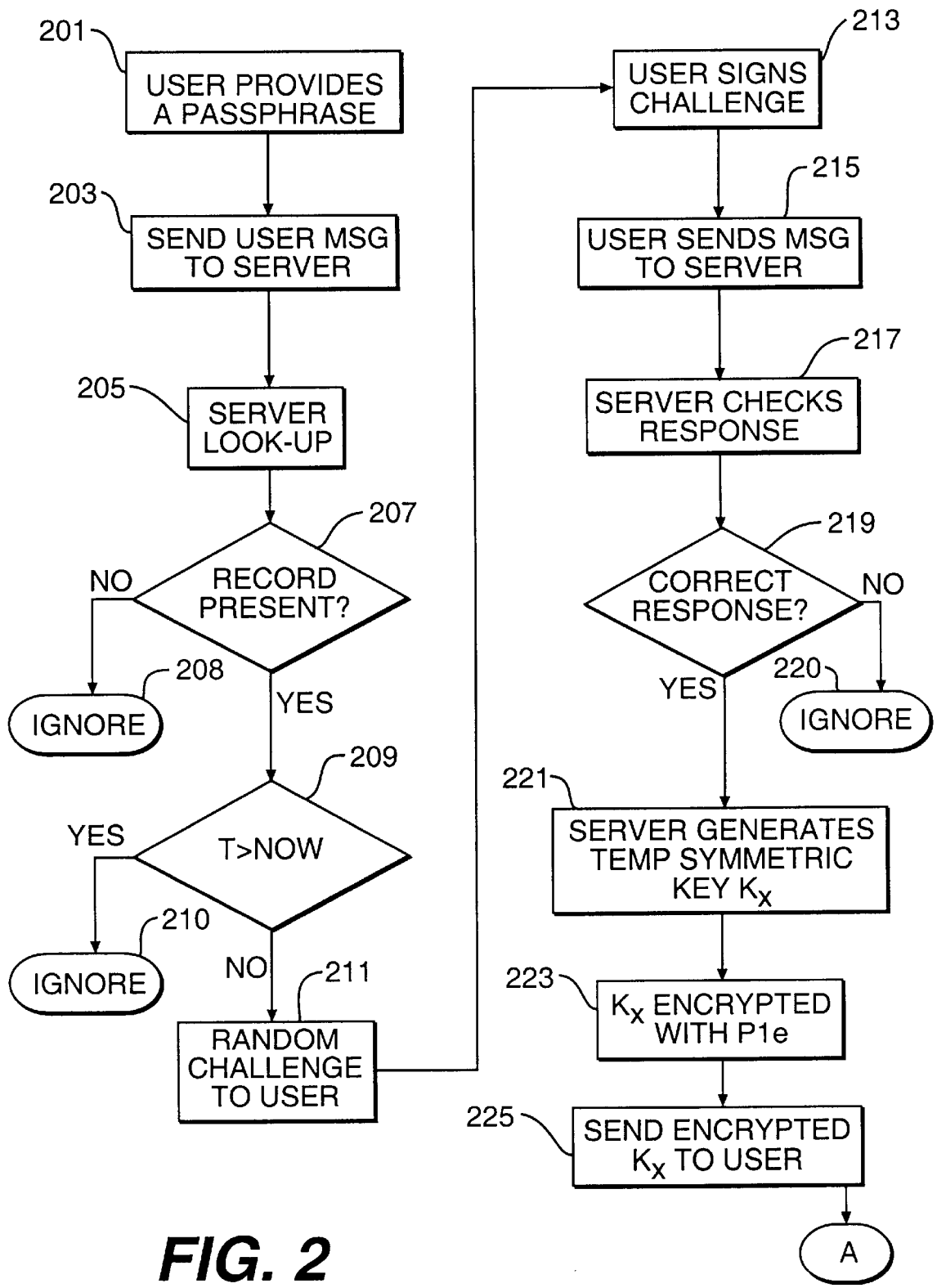
FIG. 2. The routine operation protocol

Referring now to FIG. 2, the routine operation protocol is described. In routine operations the user provides a passphrase 201 to open the enciphered data on the user's disk. The user then sends a message to the server, comprising the user's public signature key P1s and a transaction I.D. (Z) 203. The server receives the message from the user and looks up the user's record by referring to the public key as an index to that record 205. If there is no such record 207, the server ignores the message 208. Alternatively, if the record does exist but time T (defined as a time until which the server will refuse to service this user) is greater than the present time (according to the internal clock of the server), the server will also ignore the message 210 giving no reply to the user.

If the record is present and the time T is not greater than the present time as determined by the server's internal clock, 209, the server sends a random challenge, Y, back to the user identified by the signature key, P1s, used by the user initially 211.

When the user receives the random challenge and transaction I.D. the user signs that challenge as part of a message with the user's private key K1 213 and sends that message back to the server 215.

The server checks the signature on the challenge response 217 and if the signature is incorrect it ignores the response 219. If the signature is correct 219 the server generates a temporary symmetric key, $K_x$ 221 and encrypts $K_x$ using the public enciphering key, P1e, of the user 223. Thereafter the encrypted temporary symmetric key $K_x$ is sent back to the user 225 now properly identified by P1s, and preliminarily authenticated by a digital signature proving the user has possession of K1s. This may or nay not be the correct user. If it is not the correct user, then it is someone who has physical access to the user's computer and was able to access the user's enciphered filed and guess the user's passphrase for that file.

Figure 3:
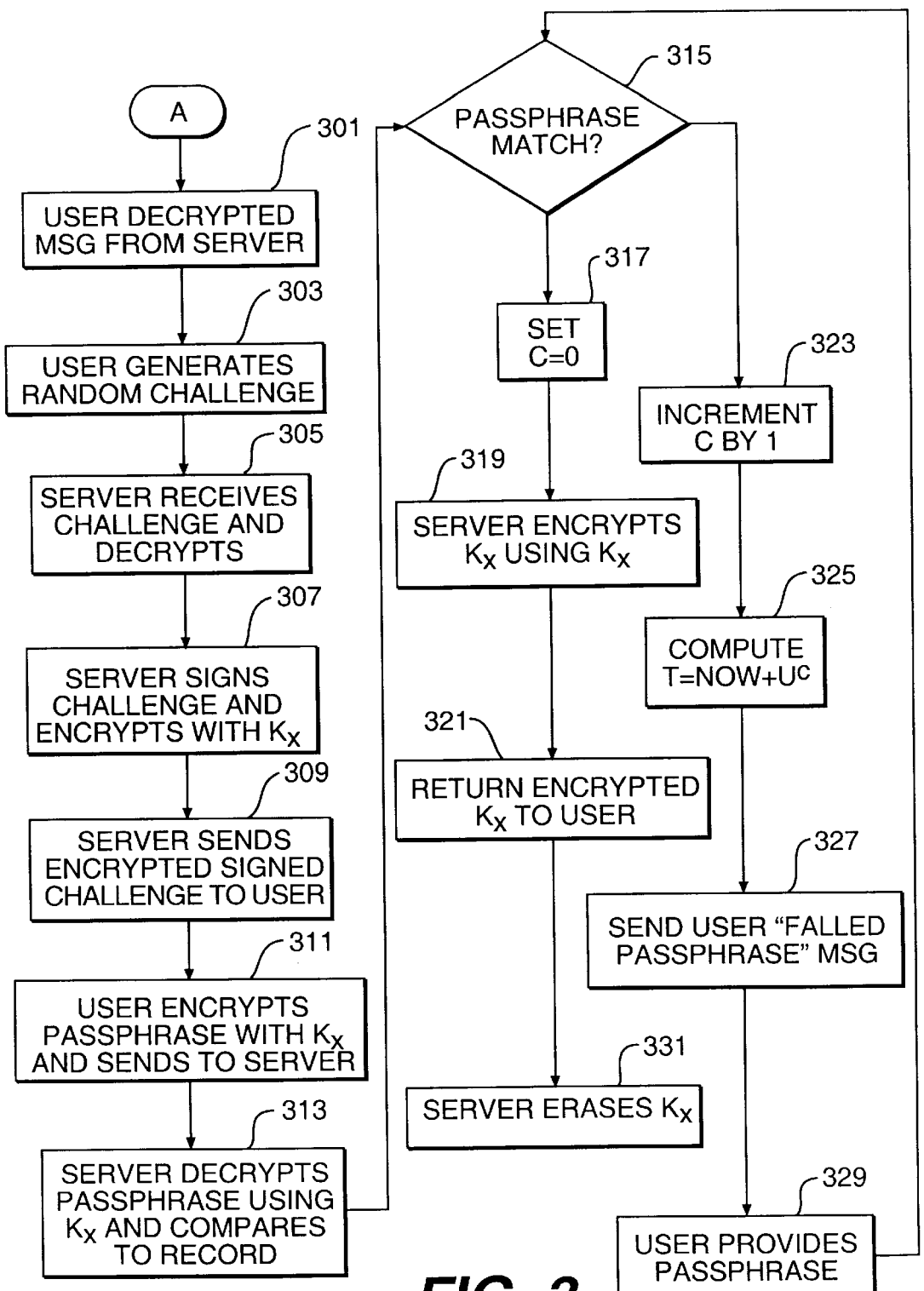
FIG. 3. The routine operation protocol continued

Referring to FIG. 3, the routine operation protocol description is continued. The user next decrypts the message from the server using the user's private key K1e 301. By virtue of this decryption, the user now holds the temporary symmetric session key $K_x$. The user then generates a random challenge to the server 303 and sends that challenge encrypted under the symmetric session key $K_x$.

The server receives and decrypts the random challenge from the user 305 and decrypts that message using the symmetric $K_x$.

The server then signs the challenge from the user and encrypts the message 307 and returns the signed message to the user 309 encrypted using the temporary symmetric session key $K_x$. After receiving the signed challenge and verifying its signature, thereby satisfying itself that this is a legitimate communication, the user encrypts his passphrase using the symmetric session key $K_x$ and sends that message to the server that has now bee authenticated by public key challenge and response 311. The server decrypts the passphrase using the temporary symmetric session key $K_x$ and checks that passphrase against the user's record 313. If the passphrase matches the record 315 the server sets the user's integer count C to zero, 317, and encrypts the high entropy symmetric key Ks under the temporary symmetric session key $K_x$ 319 and returns the encrypted symmetric key Ks to the user 321 for subsequent use. The server then erases any record of the temporary symmetric session key Kx 331.

If the passphrase does not match 315 the server increases the user's failure count C by 1 323 and computes the time when the user should try the passphrase again. This time is given by the equation $T = Now + U^c$ where U is a constant 325 and "$U^c$" means U raised to the C power. The server then responds to the user that the passphrase failed to match the record in the user's file 327 and the user should try again at the newly calculated time T. This message to the user is encrypted using the temporary symmetric session key $K_x$. The user may try again to provide a passphrase to the system 329 to gain the desired access, after time T.

Using this equation and, for example, if the constant U equaled 6 and time T was in seconds, a user can make 3 false attempts in under one minute. However, ten false trials would take 2.3 years without the user ever accessing the protected data.

Once the user receives the symmetric key $K_s$, the server erases the temporary symmetric session key $K_x$. Thereafter the user uses the symmetric key $K_x$ to decipher and possible re-encipher especially sensitive data, including K2, within its file of data.

Security Advantages of the Present System

With the present invention a passive eavesdropper who has no access to the tamper resistant networked hardware or to the user's computer or disk has no ability to interfere with any operation.

An active eavesdropper has no access to the protected networked hardware. However, if an active eavesdropper can impersonate the protected networked hardware of the present invention, is could potentially acquire adequate information. This attack is guarded against by issuing credentials in the form of a trusted certificate for the public key of the server.

If a user employs a standard tamper resistant taken in his own possession, such as a smartcard or PCMCIA card, an unauthorized party with access to a user's PC can examine the smartcard or PCMCIA card. If the unauthorized party is highly sophisticated various attacks might be used to extract the secret key information from the card. However, in most cases an unauthorized party will simply be able examine the card and subsequently steal it. If that party steals the card the party must guess the user's passphrase or pass phrase. Any such hardware token would encompass a form of counter to detect the number of incorrect guesses and after a certain threshold is reached, the card will either erase itself or will be rendered into a state where it cannot communicate with the PC. In this case the unauthorized party would not obtain the user's private key. Under a common design feature of such cards, repetitive incorrect guesses would cause that key to be destroyed in the hardware token.

Under the present invention, an unauthorized party can potentially steal a copy of a user's encrypted data. Such a person could do a brute force attempt to guess the user's pass phrase. If the passphrase is obtained, the unauthorized party will have knowledge of the public keys, P1s and P1e and the corresponding private key of the user as well as a public key of the server. The person would also have the user's sensitive secrets but only encrypted by the symmetric key $K_s$.

With the unauthorized party having the public and private key of the user such a person could contact the networked tamper resistant device and attempt to guess passphrases. The tamper resistant server however will keep a count of the number of failures of the impersonated user and limit the rate at which guesses could occur by exponentially spreading out time of the next guess. As part of the network management, the tamper resistant device also has the capability of notifying the user of repeated attempts to attack the user's passphrase.

In the event that an unauthorized party has penetrated the networked tamper resistant server, that person can acquire high entropy symmetric keys $K_s$ for a large number of users. However, any such unauthorized party would also have to acquire data from those users' disks before the person could be able to impersonate any one of them. The networked tamper resistant server does not have enough information by itself to be usable. Therefore, a party that steals information from the tamper resistant server cannot obtain access to a user's key without also breaking into the user's property.

Using the present invention, the only way that an unauthorized party can gain access is to modify a user's computer system such that the passphrase is captured and stored elsewhere or transmitted to another location. If the unauthorized party can subsequently steal the user's disk data and access the tamper resistant device then access can be gained to the user's files.

Thus using the present invention it is much less likely that the user's truly sensitive data can be compromised.

While a specific embodiment of the networked tamper resistant system has been described, those skilled in the art will appreciate that some modest modifications of the disclosed invention can be made without departing from the scope of the invention as disclosed.

What is claimed is:

1. A tamper resistant method for securing a user's data comprising:
   initializing the presence of at least one user on a tamper resistant networked device using a first protocol; and
   establishing routine operations by the user on the network using a second protocol, wherein the first protocol comprises:
      the user sending a message to a network server;
      the server verifying the presence of a user record;
      the server creating a new record if an existing record does not exist;
      the server sending a random challenge to the user;
      the user signing the random challenge and sending the signed random challenge to the server;
      the server verifying the user signature and thereafter generating a session key for the initialization protocol, the server further signing the session key and sending the key back to the user;
      the user choosing a passphrase, encrypting the passphrase and sending the encrypted passphrase back to the server; and
      the server generating a symmetric key, the symmetric key encrypted by the server and sent to the user.

2. A tamper resistant method for securing a user's data comprising:
   initializing the presence of at least one user on a tamper resistant networked device using a first protocol; and
   establishing routine operations by the user on the network using a second protocol, wherein the second protocol comprises:
      the user providing a passphrase to open a user workstation;
      the user sending a first message to a network server identifying the presence of the user on the network;
      the server looking up the record of the user to verify the user is permitted access;
      the server generating a random challenge to the user;
      the user signing the challenge and sending the signed challenge back to the server;
      the server checking the signed challenge;
      the server generating a temporary symmetric key and sending the temporary symmetric key back to the user, enciphered in a confidentiality key of the user's known to the server;
      the user receiving the temporary symmetric key;
      the user generating a random challenge to the server, the user encrypting the random challenge using the temporary symmetric key;
      the server signing the challenge from the user and encrypting the signed challenge using the temporary symmetric key;
      the user verifying the signature on the challenge from the server;
      the user encrypting the users passphrase using the temporary symmetric key and sending the encrypted passphrase to the server;
      the server decrypting the encrypted passphrase and checking the passphrase against a record of the users passphrase stored in the server; and, if that passphrase is correct;
      the server sending a symmetric key to the user for subsequent use.

3. The tamper resistant method for securing a user's data of claim 2 wherein the first user message comprises the user's public key, and a transaction identifier.

4. The tamper resistant method for securing a user's data of claim 2 wherein the server looking up the record of the user further comprises accessing records concerning the user which records are indexed according to the public key of the user.

5. The tamper resistant method for securing a user's data of claim 4 wherein further comprising the server ignoring the message if no record of the user exists.

6. The tamper resistant method for securing a user's data of claim 4 further comprising ignoring the message if the next permitted interaction time associated with the user is greater than the present server time.

7. The tamper resistant method for securing a user's data of claim 2 further comprising the server sending a random challenge to the user only if the current time is greater than the next permitted interaction time associated with the user.

8. The tamper resistant method for securing a user's data of claim 2 wherein the random challenge generated by the server sent to the user further comprises a transaction ID.

9. The tamper resistant method for securing a user's data of claim 2 wherein the user signing the challenge message further comprises the user signing the message with the user's private key.

10. The tamper resistant method for securing a user's data of claim 2 wherein the checking of the signed challenge further comprises ignoring the user message if the signed challenge response is incorrect.

11. The tamper resistant method for securing a user's data of claim 2 wherein the server generating a temporary symmetric key further comprises encrypting the temporary symmetric key using the public key of the user.

12. The tamper resistant method for securing a user's data of claim 11 wherein the user receiving the temporary symmetric key further comprises the user decrypting the encrypted temporary symmetric key using the user's private key.

13. The tamper resistant method for securing a user's data of claim 1 wherein the user message further comprises the user's public key, a transaction identifier, and a request for a new record.

14. The tamper resistant method for securing a user's data of claim 1 wherein verifying the presence of a record by the server comprises using the user's public key to determine if a record exists.

15. The tamper resistant method for securing a user's data of claim 14 wherein verifying the presence of a record further comprises ignoring the user message if a record exists.

16. The tamper resistant method for securing a user's data of claim 1 wherein the server sending the session key back to the user further comprises encrypting the session key with the public key if the user.

17. The tamper resistant method for securing a user's data of claim 1 wherein the user encrypting the passphrase further comprises encrypting the passphrase with the session key.

18. The tamper resistant method for securing a user's data of claim 1 wherein the sending of the symmetric key to the user further comprises encrypting the symmetric key using the session key.

* * * * *

UNITED STATES PATENT AND TRADEMARK OFFICE
CERTIFICATE OF CORRECTION

| | | |
|---|---|---|
| PATENT NO. | : 6,073,237 | Page 1 of 1 |
| APPLICATION NO. | : 08/965595 | |
| DATED | : June 6, 2000 | |
| INVENTOR(S) | : Ellison | |

It is certified that error appears in the above-identified patent and that said Letters Patent is hereby corrected as shown below:

| <u>Col</u> | <u>Line</u> | |
|---|---|---|
| 3 | 49 | Change "user's" to --users-- |
| 5 | 53 | Change "filed" to --file-- |
| 7 | 20 | Change "users' disks" to --users' disks-- |

Signed and Sealed this

Twentieth Day of February, 2007

JON W. DUDAS
*Director of the United States Patent and Trademark Office*